(12) United States Patent
Lee et al.

(10) Patent No.: US 10,987,798 B2
(45) Date of Patent: Apr. 27, 2021

(54) WEARABLE CHAIR

(71) Applicants: Samsung Electronics Co., Ltd., Suwon-si (KR); Korea University of Technology and Education Industry-University Cooperation Foundation, Cheonan-si (KR)

(72) Inventors: Minhyung Lee, Seoul (KR); Youn Baek Lee, Yongin-si (KR); Yong jae Kim, Cheonan-si (KR); Jongwon Lee, Suwon-si (KR); Byungjune Choi, Gunpo-si (KR)

(73) Assignees: SAMSUNG ELECTRONICS CO., LTD., Gyeonggi-do (KR); KOREA UNIVERSITY OF TECHNOLOGY AND EDUCATION INDUSTRY-UNIVERSITY COOPERATION FOUNDATION, Chungcheongnam-do (KR)

( * ) Notice: Subject to any disclaimer, the term of this patent is extended or adjusted under 35 U.S.C. 154(b) by 0 days.

(21) Appl. No.: 16/655,831

(22) Filed: Oct. 17, 2019

(65) Prior Publication Data

US 2020/0206900 A1     Jul. 2, 2020

(30) Foreign Application Priority Data

Dec. 27, 2018   (KR) ........................ 10-2018-0170656

(51) Int. Cl.
*A47C 9/10*     (2006.01)
*A47C 9/02*     (2006.01)
(Continued)

(52) U.S. Cl.
CPC ............... *B25J 9/0006* (2013.01); *A47C 4/04* (2013.01); *A47C 7/002* (2013.01); *A47C 9/00* (2013.01);
(Continued)

(58) Field of Classification Search
CPC ...... A47C 9/10; A47C 9/025; A61H 2003/007
(Continued)

(56) References Cited

U.S. PATENT DOCUMENTS 4,138,156 A * 2/1979 Bonner .................... A47C 9/10
297/4
4,456,003 A * 6/1984 Allard .................. A61F 5/0102
602/16
(Continued)

FOREIGN PATENT DOCUMENTS

JP     5061285 B2    10/2012
JP     2013503026 A    1/2013
(Continued)

*Primary Examiner* — Robert Canfield
(74) *Attorney, Agent, or Firm* — Harness, Dickey & Pierce, P.L.C.

(57) ABSTRACT

A wearable chair may include a foot frame configured to support a foot of a user; a shank link configured to rotatably connect to the foot frame; a connecting link provided in front of the shank link and configured to rotatably connect to the foot frame; a knee link configured to rotatably connect to each of the shank link and the connecting link; and a thigh link configured to extend from the knee link. The foot frame, the shank link, the connecting link, and the knee link constitute a four-bar linkage.

20 Claims, 12 Drawing Sheets

(51) Int. Cl.
*B25J 9/00* (2006.01)
*A47C 4/04* (2006.01)
*A47C 7/00* (2006.01)
*A47C 9/00* (2006.01)
*A61H 1/02* (2006.01)
*A61H 3/00* (2006.01)

(52) U.S. Cl.
CPC ............... *A47C 9/025* (2013.01); *A47C 9/10* (2013.01); *A61H 1/024* (2013.01); *A61H 1/0266* (2013.01); *A61H 3/008* (2013.01); *A61H 2003/007* (2013.01)

(58) Field of Classification Search
USPC ............................................. 297/4, 17; 601/5
See application file for complete search history.

(56) References Cited

U.S. PATENT DOCUMENTS

| | | | |
|---|---|---|---|
| 6,666,796 B1* | 12/2003 | MacCready, Jr. | A61F 5/0102 135/65 |
| 7,544,155 B2 | 6/2009 | Agrawal et al. | |
| 7,963,932 B2* | 6/2011 | Ashihara | A61F 5/0102 601/5 |
| 9,463,570 B2 | 10/2016 | Kim et al. | |
| 9,554,360 B2 | 1/2017 | Kamon | |
| 9,554,960 B2* | 1/2017 | Kamon | B25J 9/0006 |
| 10,271,660 B2* | 4/2019 | Gunura | A47C 9/025 |
| 2008/0234608 A1* | 9/2008 | Sankai | A61H 3/00 601/5 |
| 2010/0256537 A1* | 10/2010 | Menga | B25J 9/0006 601/34 |
| 2013/0006159 A1* | 1/2013 | Nakashima | A61H 1/024 602/23 |
| 2013/0053736 A1* | 2/2013 | Konishi | H01M 10/482 601/34 |
| 2016/0135604 A1 | 5/2016 | Kim | |
| 2016/0175180 A1* | 6/2016 | Bond | A61F 5/0102 602/23 |
| 2016/0262969 A1 | 9/2016 | Ohta et al. | |
| 2016/0331486 A1* | 11/2016 | Nakatani | B25J 9/0006 |
| 2017/0008164 A1* | 1/2017 | Lee | A61H 1/02 |
| 2019/0328605 A1* | 10/2019 | van den Bogert | A61H 3/00 |
| 2020/0155390 A1* | 5/2020 | Bae | A47C 9/025 |

FOREIGN PATENT DOCUMENTS

| | | | |
|---|---|---|---|
| JP | 2014195506 A | 10/2014 | |
| KR | 101084341 B1 | 11/2011 | |
| KR | 101417482 B1 | 7/2014 | |
| KR | 20150067474 A | 6/2015 | |
| WO | WO-2019120760 A1 * | 6/2018 | ............ A61F 5/0125 |

* cited by examiner

WEARABLE CHAIR

CROSS-REFERENCE TO RELATED APPLICATION

This application claims priority under 35 U.S.C. § 119 to Korean Patent Application No. 10-2018-0170656, filed on Dec. 27, 2018, in the Korean Intellectual Property Office, the entire contents of which are incorporated herein by reference in their entirety.

BACKGROUND

1. Field

Some example embodiments relate to a wearable chair.

2. Description of the Related Art

Various types of wearable chairs are being developed. However, it may be difficult for a wearable chair to enhance stability to inhibit (or, alternatively, prevent) a user from falling backward when, for example, the user rocks backwards and forwards.

SUMMARY

Some example embodiments relate to a wearable chair.

In some example embodiments, the wearable chair includes a foot frame configured to support a foot of a user; a shank link configured to rotatably connect to the foot frame; a connecting link configured to rotatably connect to the foot frame; a knee link configured to rotatably connect to each of the shank link and the connecting link such that the foot frame, the shank link, the connecting link, and the knee link form a four-bar linkage; and a thigh link configured to extend from the knee link.

In some example embodiments, the thigh link includes a thigh link body having a first end and a second end, the first end connected to the knee link such that the thigh link body is configured to extend from the knee link backward towards a posterior of the user; and a thigh link head at the second end of the thigh link body.

In some example embodiments, the thigh link head is configured to move along a downward convex path while the shank link rotates backward towards the posterior based on the foot frame.

In some example embodiments, the thigh link head is configured to ascend while the shank link rotates backward towards the posterior based on the foot frame.

In some example embodiments, the knee link and the thigh link are integrally formed.

In some example embodiments, the shank link rotates backward towards a posterior of the user based on the foot frame, the four-bar linkage is configured to move such that an angle between the shank link and the knee link gradually decreases and an angle between the connecting link and the knee link gradually increases.

In some example embodiments, a length of the shank link is greater than a length of the connecting link.

In some example embodiments, a travel path of a first joint connecting the shank link and the knee link intersects a travel path of a second joint connecting the connecting link and the knee link.

In some example embodiments, the foot frame includes a foot frame body; and a first support part configured to protrude upward from the foot frame body, and to rotatably support the shank link.

In some example embodiments, the foot frame further includes a second support part, the second support part having a length greater than a length of the first support part, the second support part configured to protrude upward from the foot frame body, and to rotatably support the connecting link.

In some example embodiments, the first support part and the second support part are connected to the foot frame body such that a distance between the first support part and the second support part is adjustable.

In some example embodiments, the connecting link and the second support part are connected such that a distance between a joint that connects the connecting link and the second support part and the foot frame body is adjustable.

In some example embodiments, the connecting link is configured to selectively disconnect from the foot frame to break the four-bar linkage.

In some example embodiments, the thigh link includes a coupler configured to fasten the connecting link to the thigh link when the connecting link is disconnected from the foot frame.

In some example embodiments, a length of at least one of the shank link, the connecting link, the knee link, and the thigh link is adjustable.

In some example embodiments, the wearable chair further includes a shank fastening part configured to fasten the shank link to a shank of the user; and a thigh fastening part configured to fasten the thigh link to a thigh of the user.

Other example embodiments relate to a wearable chair.

In some example embodiments, the wearable chair includes a thigh link configured to support a thigh of a user; a foot frame configured to support a foot of the user; a knee link configured to extend forward from the thigh link; a shank link configured to rotatably connect to the knee link and the foot frame, and to support a shank of the user; and a connecting link configured to rotatably connect to the knee link and the foot frame such that the foot frame, the shank link, the connecting link, and the knee link form a four-bar linkage.

In some example embodiments, an upper end of the thigh link is configured to move along a downward convex path while the shank link rotates backward towards a posterior of the user based on the foot frame.

In some example embodiments, a travel path of a first joint that connects the shank link and the knee link intersects a travel path of a second joint that connects the connecting link and the knee link.

In some example embodiments, the connecting link is configured to selectively disconnect from the foot frame to break the four-bar linkage.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
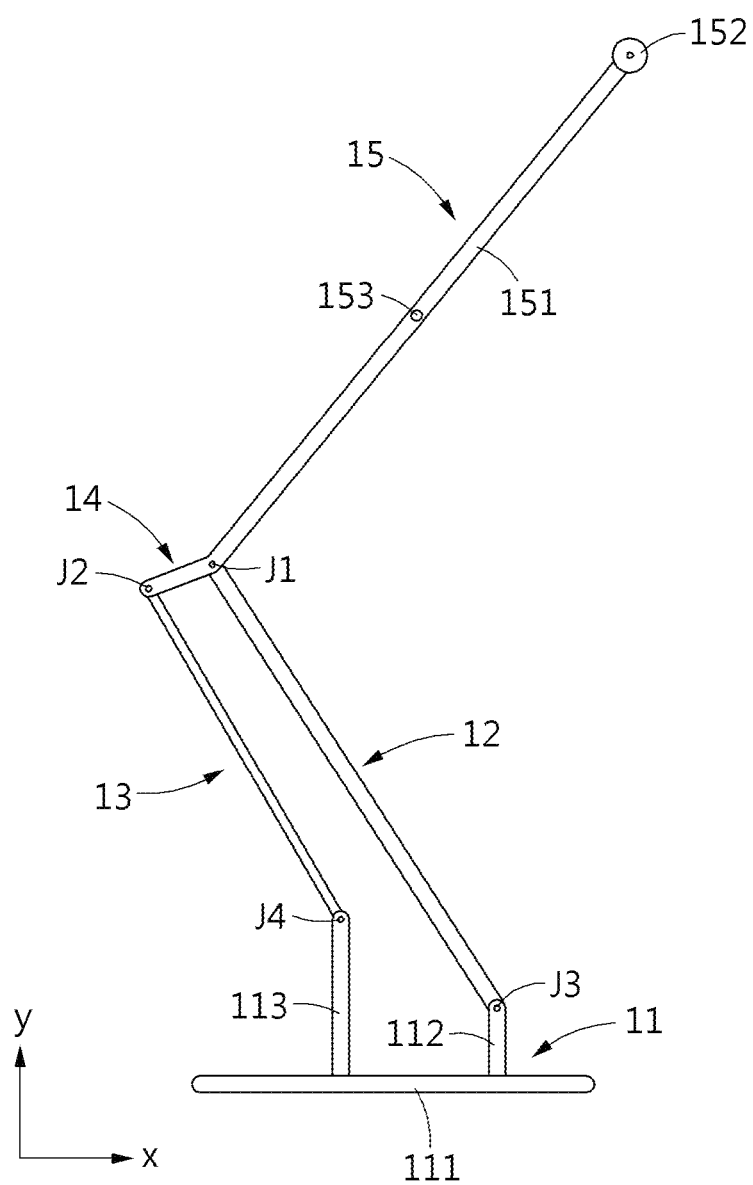
FIG. 1 is a side view of a wearable chair according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component included in one example embodiment and a component including a common function are described using the same name in other example embodiments. Unless described otherwise, description made in one example embodiment may be applicable to other example embodiments and further repetitive description will be omitted.

Figure 2:
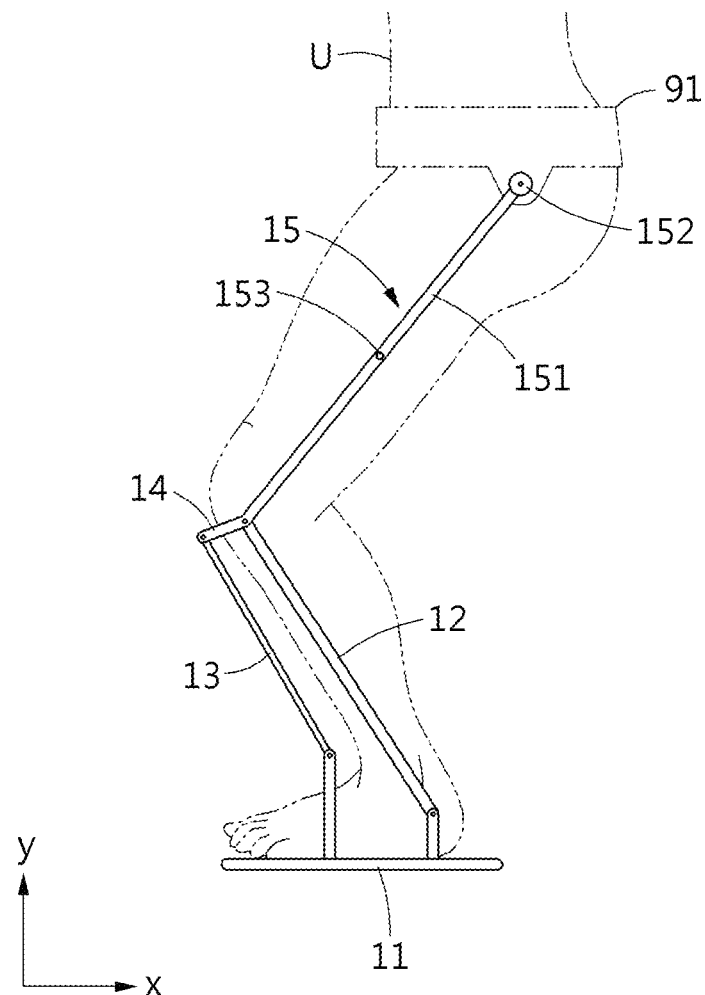
FIG. 2 is a side view of a user wearing a wearable chair according to an example embodiment.

FIG. 1 is a side view of a wearable chair according to an example embodiment, and FIG. 2 is a side view of a user wearing a wearable chair according to an example embodiment.

Referring to FIGS. 1 and 2, a wearable chair 1 may support load of a user U. The wearable chair 1 may set a movement at 1 degree of freedom (1 DoF) through a four-bar linkage. The wearable chair 1 may structurally assist the user U not to fall backward (x direction) without using a separate driving source.

The wearable chair 1 may include a foot frame 11, a shank link 12, a connecting link 13, a knee link 14, and a thigh link 15.

For clarity of description, a joint that connects the shank link 12 and the knee link 14 is referred to as a first joint J1, a joint that connects the connecting link 13 and the knee link 14 is referred to as a second joint J2, a joint that connects the shank link 12 and the foot frame 11 is referred to as a third joint J3, and a joint that connects the connecting link 13 and the foot frame 11 is referred to as a fourth joint J4. Any type of joints capable of implementing 1 DoF may be used for the first to fourth joints J1, J2, J3, and J4. For example, the first joint J1 to the fourth joint J4 may be hinge joints.

The foot frame 11 may support a foot of the user U. The foot frame 11 may function as a fixed link. The foot frame 11 may include a foot frame body 111, a first support part 112, and a second support part 113. The foot frame 11 may further include a foot fastening part (not shown) configured to fasten the foot of the user U to the wearable chair 1. For example, the foot fastening part may be a length-adjustable elastic band.

The foot frame body 111 may support a sole of the foot of the user U. For example, the foot frame body 111 may insert into a shoe and may support the foot of the user U or support an outsole of the shoe. The foot frame body 111 may include a buffering member (not shown) to enhance a wear sensation of the user U.

The first support part 112 may protrude upward from the foot frame body 111 and may rotatably support the shank link 12. The first support part 112 may position a center of rotation of the shank link 12 relative to the foot frame 11 at a point separate upward from the foot frame body 111, not at the foot frame body 111. For example, the first support part 112 may match the center of rotation of the shank link 12 relative to the foot frame 11 to an ankle joint of the user U.

The second support part 113 may protrude upward from the foot frame body 111 and may rotatably support the connecting link 13. The second support part 113 may have a length greater than greater than that of the first support part 112. A distance between the foot frame body 111 and the third joint J3 may be less than a distance between the foot frame body 111 and the fourth joint J4. That is, a center of rotation of the connecting link 13 relative to the foot frame 11 may be above the center of rotation of the shank link 12 relative to the foot frame 11. The second support part 113 may be positioned in front of the first support part 112.

The shank link 12 may rotatably connect to the foot frame 11. The shank link 12 may be in parallel with a shank of the user U. In response to flexion or extension of the ankle joint of the user U, an angle formed between the foot frame 11 and the shank link 12 may vary. The shank link 12 may be rotatably connected at an upper end of the first support part 112. The center of rotation of the shank link 12 relative to the foot frame 11 may be in parallel with an axis of rotation of the ankle joint.

The connecting link 13 may rotatably connect to the foot frame 11. The connecting link 13 may be positioned in front of the shank link 12. The connecting link 13 may be rotatably connected at an upper end of the second support part 113. The center of rotation of the connecting link 13 relative to the foot frame 11 may be above the center of rotation of the shank link 12 relative to the foot frame 11. A length of the connecting link 13 may be less than that of the shank link 12. Since the center of rotation of the connecting link 13 is above the center of rotation of the shank link 12 and the connecting link 13 has the length less than that of the shank link 12, a travel path of the first joint J1 and a travel path of the second joint J2 may intersect. Due to the above structure, the wearable chair 1 may prevent the user U from falling backward. Further description will be made with reference to FIGS. 5 to 8.

The knee link 14 may rotatably connect to each of the shank link 12 and the connecting link 13. A rear end of the knee link 14 may be rotatably connected to the shank link 12 and a front end of the knee link 14 may be rotatably connected to the connecting link 13.

The thigh link 15 may extend from the knee link 14. The thigh link 15 may be in parallel with a thigh of the user U. A relative movement between the thigh link 15 and the knee link 14 may be limited. The thigh link 15 may be fastened to the knee link 14. For example, the thigh link 15 and the knee link 14 may be integrally formed such that an angle between the thigh link 15 and the knee link 14 may be fixed. As such, as the knee frame 14 rotates downwards in a counterclockwise direction about the first joint J1, the thigh link 15 extending from the other side of the first joint J1, may rotate upwards in the counterclockwise direction about the first joint J1 in the counterclockwise direction.

The thigh link 15 may include a thigh link body 151, a thigh link head 152, and a coupler 153.

The thigh link body 151 may extend backward from the knee link 14. The thigh link body 151 and the knee link 14 may form a V shape having a downward apex.

The thigh link head 152 may be provided at an upper end of the thigh link body 151. For example, the thigh link head 152 may be in parallel with a hip joint of the user U. The thigh link head 152 may move along a downward convex path while the shank link 12 rotates backward based on the foot frame 11 (see an indicator with an arrowhead). The thigh link head 152 may rotatably connect to a proximal fastening part 91 configured to surround the waist and/or pelvis of the user U. A movement of the thigh link 15 may be confined by the foot frame 11, the shank link 12, the connecting link 13, and the knee link 14 that constitute the four-bar linkage and perform a 1 DoF motion. While the shank link 12 rotates backward based on the foot frame 11, the thigh link head 152 may move upward and lift the proximal fastening part 91. Through this mechanism, the wearable chair 1 may inhibit (or, alternatively, prevent) the user U from falling backward and may assist the user U to stand up without using a separate driving source.

Figure 10:
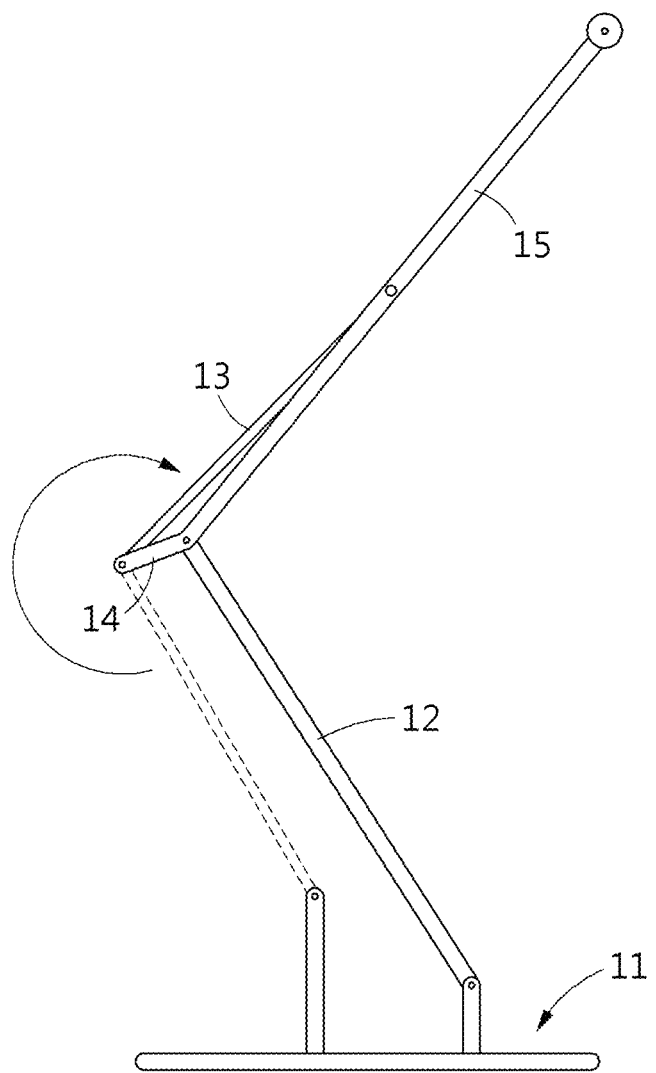
FIG. 10 is a side view illustrating a state in which a connecting link of a wearable chair is fastened to a thigh link according to an example embodiment.

The coupler 153 may selectively fasten the connecting link 13 to the thigh link 15 as illustrated in FIG. 10. For example, as illustrated in FIG. 10, the connecting link 13 may be separated from the foot frame 11 and then fastened on one surface of the thigh link body 151 by way of the coupler 153. Any type of couplers of fastening the connecting link 13 to the thigh link 15 may be used for the coupler 153.

The foot frame 11, the shank link 12, the connecting link 13, and the knee link 14 may constitute the four-bar linkage. The foot frame 11 may function as a fixed link and the shank link 12, the connecting link 13, and the knee link 14 may perform an 1 DoF motion. The foot frame 11, the shank link 12, the connecting link 13, and the knee link 14 may stably support the load of the user U. The user U may take some rest with putting the load on the wearable chair 1. Also, the foot frame 11, the shank link 12, the connecting link 13, and the knee link 14 may confine a movement of the thigh link 15 to inhibit (or, alternatively, prevent) the user U from falling backward.

The connecting link 13 may be connected to the foot frame 11 or may be separate from the foot frame 11. Although FIGS. 1 and 2 illustrate a state in which the connecting link 13 is connected to the foot frame 11, the connecting link 13 may be separate from the foot frame 11 and then be connected to the thigh link 15 as illustrated in FIG. 10.

Figure 3:
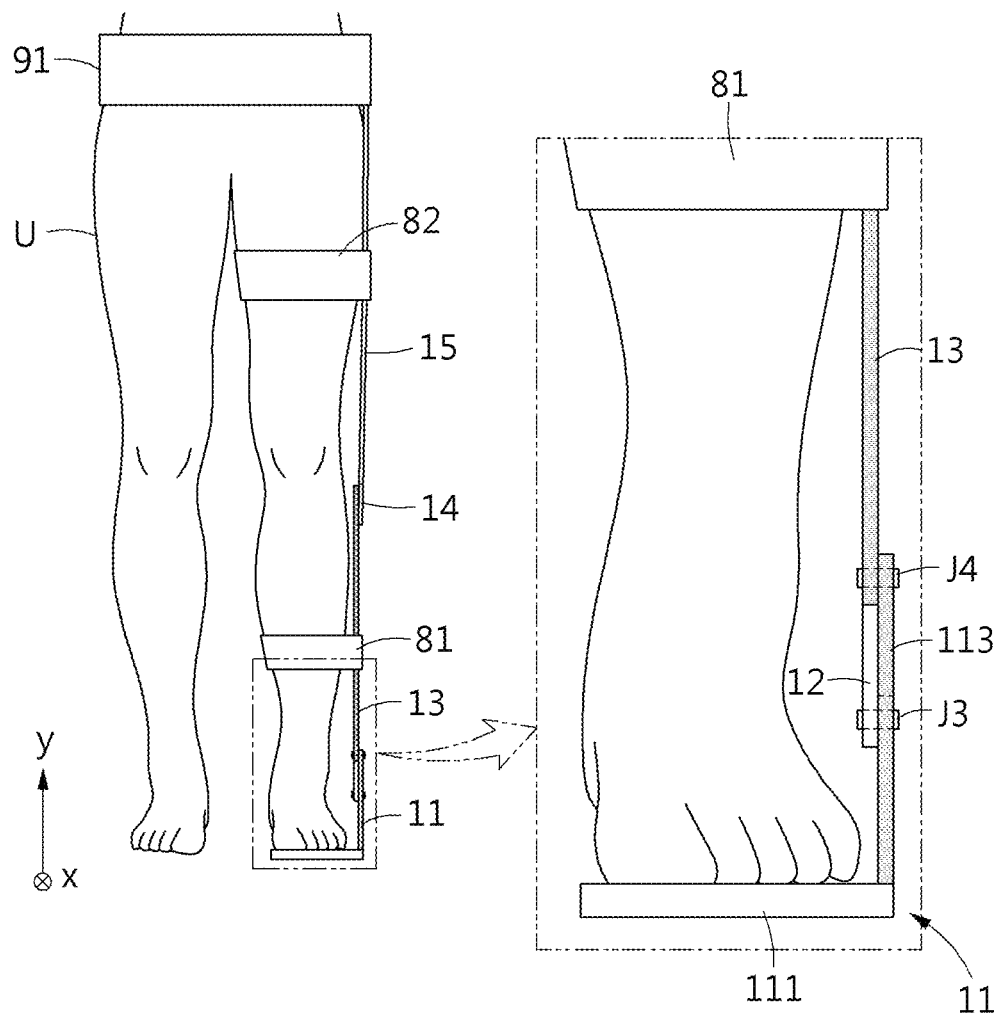
FIG. 3 illustrates a front view and a partially enlarged view of a user wearing a wearable chair according to an example embodiment.
Figure 4:
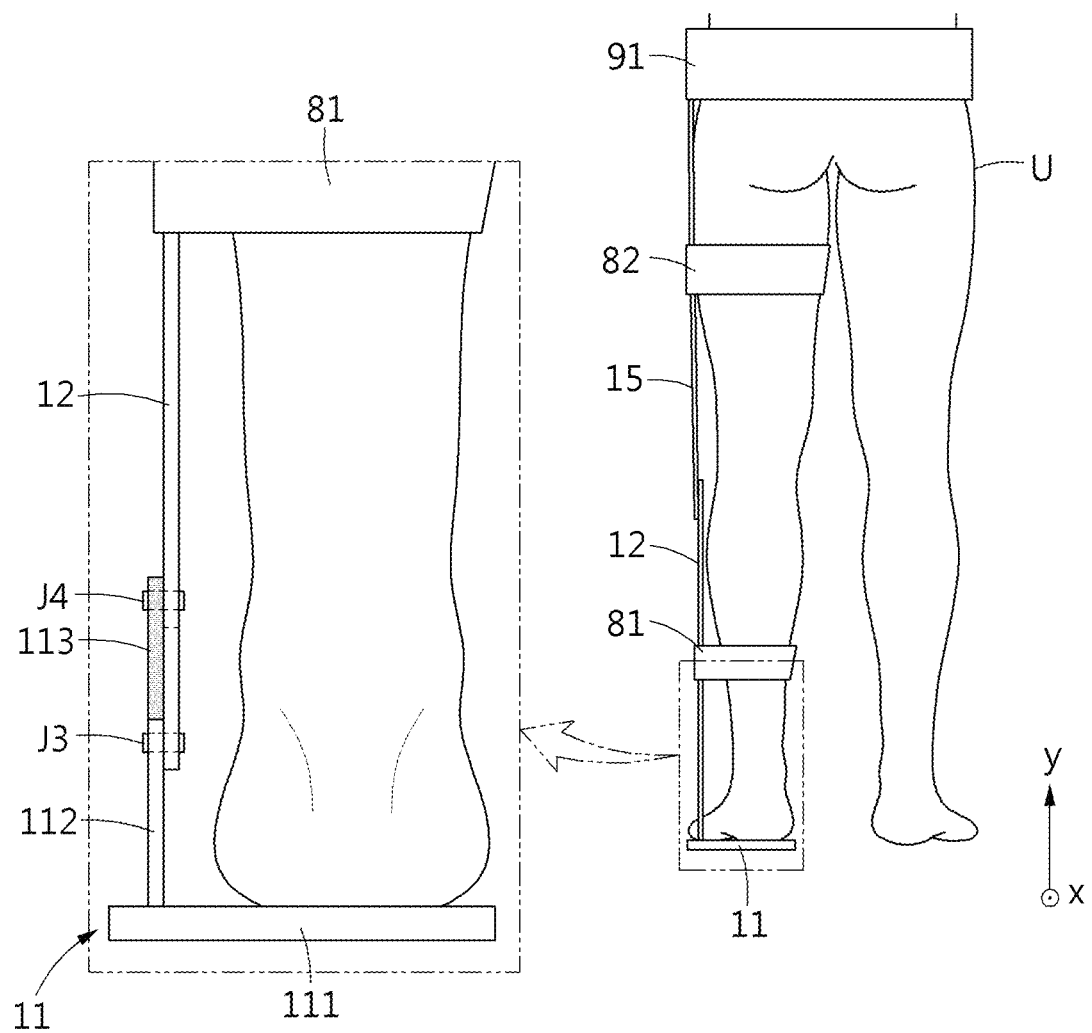
FIG. 4 illustrates a rear view and a partially enlarged view of a user wearing a wearable chair according to an example embodiment.
Figure 5:
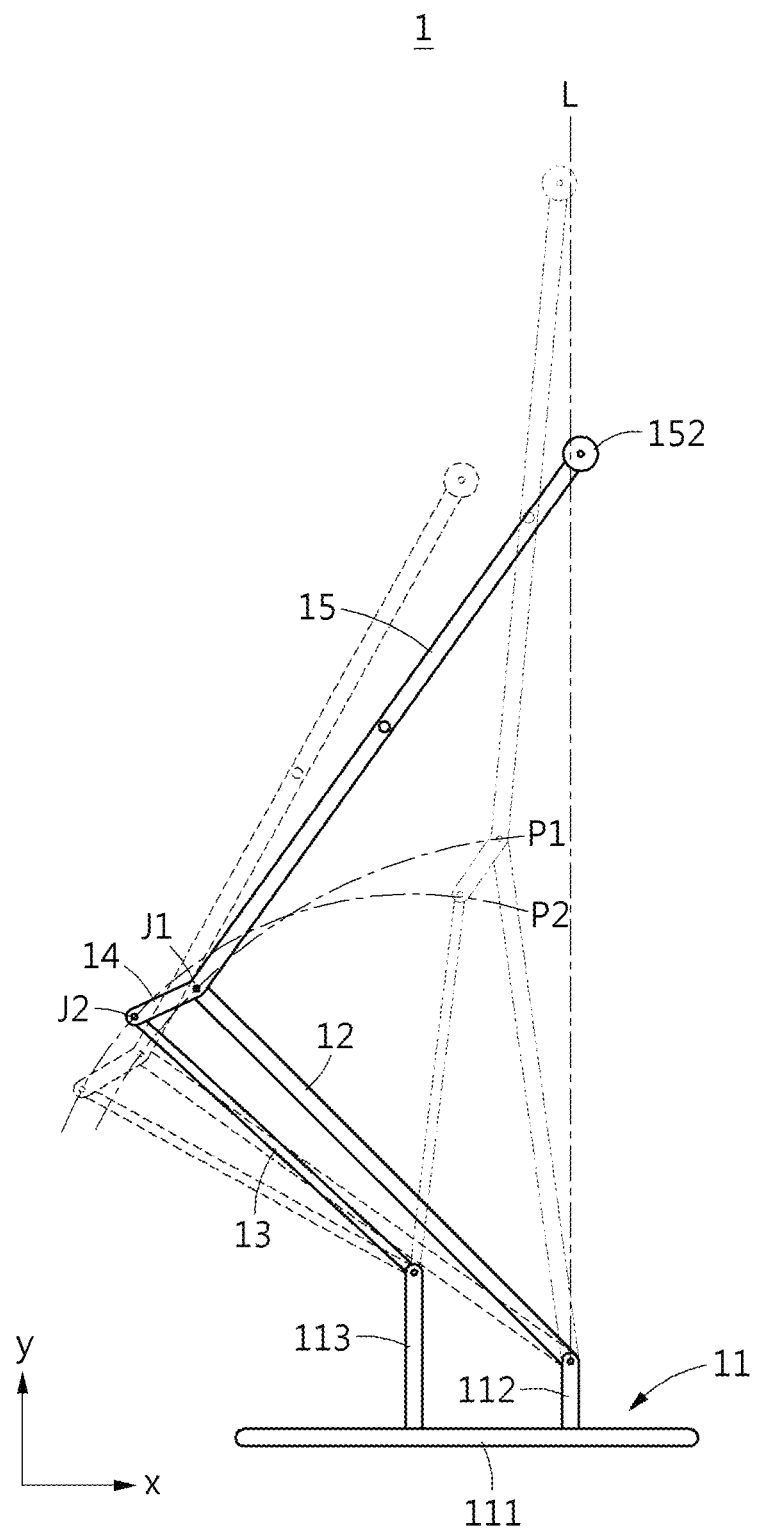
FIG. 5 is a side view to describe a motion of a wearable chair according to an example embodiment.

FIG. 3 illustrates a front view and a partially enlarged view of a user wearing a wearable chair according to an example embodiment, FIG. 4 illustrates a rear view and a partially enlarged view of a user wearing a wearable chair according to an example embodiment, and FIG. 5 is a side view to describe a motion of a wearable chair according to an example embodiment.

Referring to FIGS. 3 to 5, the wearable chair 1 may include a shank fastening part 81 configured to fasten the shank link 12 to the shank of the user U and a thigh fastening part 82 configured to fasten the thigh link 15 to the thigh of the user U. The thigh link 15 may rotatably connect to the proximal fastening part 91.

The shank fastening part 81 may be, for example, a length-adjustable band. The shank fastening part 81 may surround the shank of the user U and may be length-adjustable based on a size of the shank of the user U.

The thigh fastening part 82 may be, for example, a length-adjustable band. The thigh fastening part 82 may surround the thigh of the user U and may be length-adjustable based on a size of the thigh of the user U.

The shank fastening part 81 may assist the shank link 12 to move along a movement of the shank of the user U. The thigh fastening part 82 may assist the thigh link 15 to move along a movement of the thigh of the user U. An angle between the foot frame 11 and the shank link 12 may be determined based on a change in an angle of the ankle joint of the user U. The angle between the foot frame 11 and the shank link 12 is used to determine a shape of the four-bar linkage that includes the foot frame 11, the shank link 12, the connecting link 13, and the knee link 14. The angle at the third joint J3 between the foot frame 11 and the shank link 12 may determine an angle at the first joint J1 between the knee link 14 and the shank link 12 and an angle at the first joint J1 between the shank link 12 and the thigh link 15, since the knee link 14 and the thigh link 15 are integrally formed. Accordingly, an angle of a knee joint is determined based on a change in the angle of the ankle joint of the user U.

The thigh link head 152 may move along a downward convex path while the shank link 12 rotates backward. The thigh link head 152 may ascend while the shank link 12 rotates backward. The user U may be led to an upright state. Referring to FIG. 5, while the shank link 12 rotates backward, an angle formed by the thigh link 15 relative to the foot frame body 111 may decrease and then increase. Before reaching a state in which the angle formed by the shank link 12 relative to the foot frame body 111 is about 45 degrees as indicated with sold lines, the angle formed by the thigh link 15 relative to the foot frame body 111 may decrease while the shank link 12 rotates backward. After reaching the state in which the angle formed by the shank link 12 relative to the foot frame body 111 is about 45 degrees as indicated with sold lines, the angle formed by the thigh link 15 relative to the foot frame body 111 may increase while the shank link 12 rotates backward.

The fourth joint J4 may be above the third joint J3. A travel path P1 of the first joint J1 that connects the shank link 12 and the knee link 14 may intersect a travel path P2 of the second joint J2 that connects the connecting link 13 and the knee link 14. An interval between the travel path P1 and the travel path P2 may increase as the shank link 12 gets to be further perpendicular to the foot frame body 111. While the shank link 12 rotates relative to the foot frame 11, a length of the knee link 14 is uniform. Therefore, in a state in which the shank link 12 is approximately perpendicular to the foot frame body 111, an angle formed by the knee link 14 relative to the foot frame body 111 may suddenly increase. While the shank link 12 rotates backward relative to the foot frame 11, all of the first joint J1 and the second joint J2 move backward. However, since the second joint J2 rotates forward based on the first joint J1, the thigh link head 152 may ascend. The thigh link head 152 may lift the proximal support part 91 and the proximal support part 91 may lift the user U.

Referring to FIG. 5, an auxiliary line L that is perpendicular to the foot frame body 111 and passes the first support part 112 is illustrated. When the center of gravity of the user U is excessively offset backward from the auxiliary line L, the user U may fall backward. The four-bar linkage including the foot frame 11, the shank link 12, the connecting link 13, and the knee link 14 may assist the thigh link head 152 not to be excessively offset backward from the auxiliary line L. While the shank link 12 rotates backward relative to the foot frame 11, the thigh link head 152 may move to the back from the auxiliary line L and then move toward the auxiliary line L again.

Figure 6:
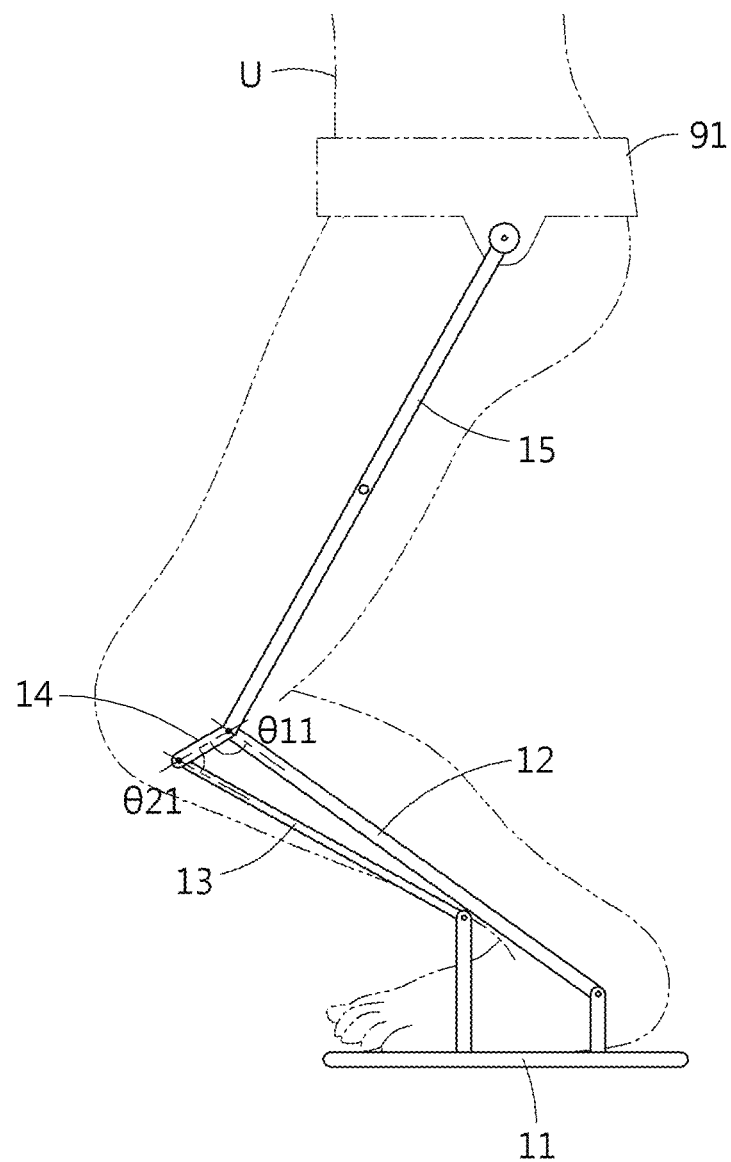
FIG. 6 is a side view of a user wearing a wearable chair according to an example embodiment.
Figure 7:
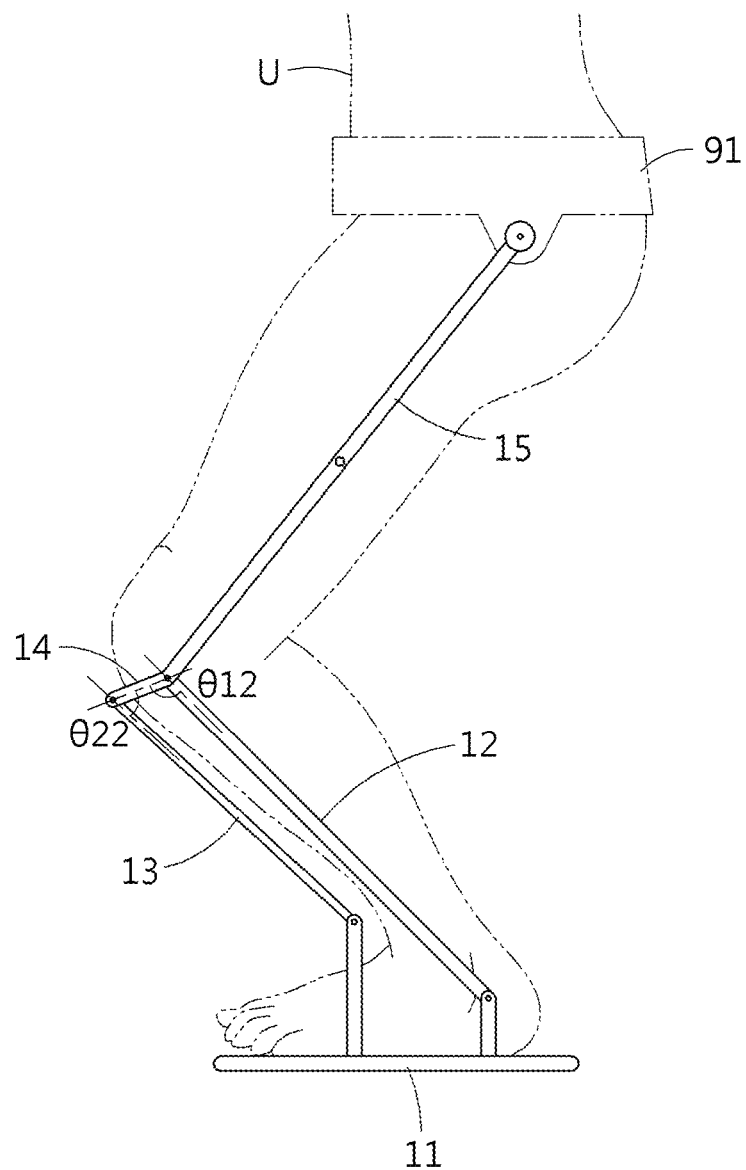
FIG. 7 is a side view illustrating a state in which the user of FIG. 6 moves the center of gravity backward.
Figure 8:
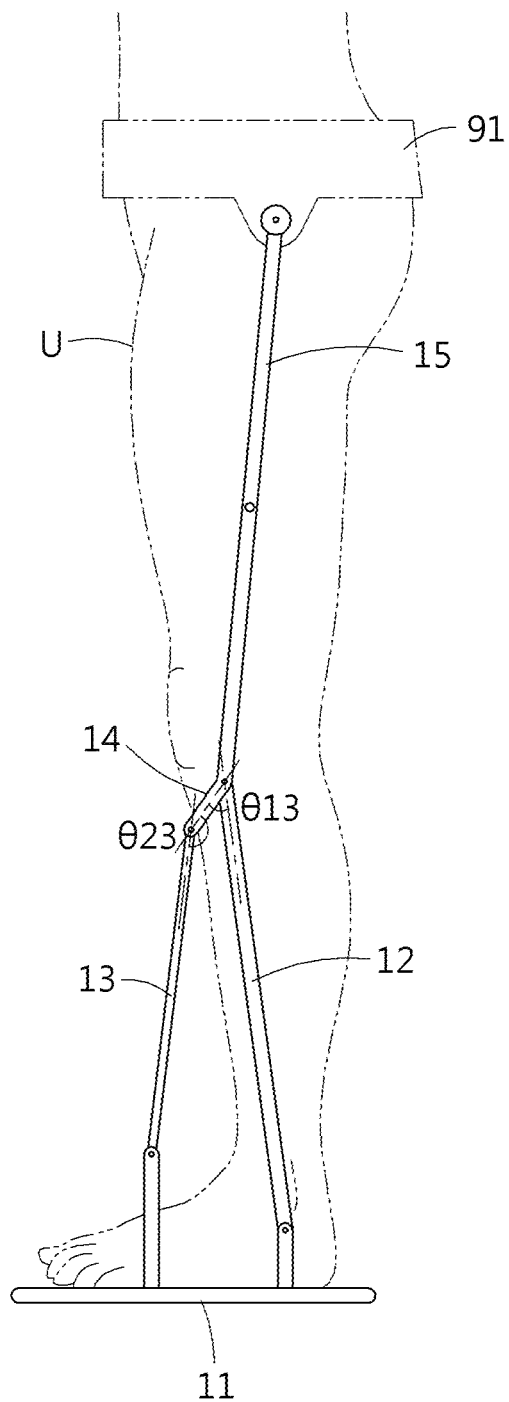
FIG. 8 is a side view illustrating a state in which the wearable chair makes the user stand up while the user of FIG. 7 moves the center of gravity backward.

FIG. 6 is a side view of a user wearing a wearable chair according to an example embodiment, FIG. 7 is a side view illustrating a state in which the user of FIG. 6 moves the center of gravity backward, and FIG. 8 is a side view illustrating a state in which the wearable chair makes the user stand up while the user of FIG. 7 moves the center of gravity backward.

Referring to FIGS. 6 to 8, while the shank link 12 rotates backward, an angle formed between the shank link 12 and the knee link 14 may gradually decrease. For example, when θ11 denotes an angle formed between the shank link 12 and the knee link 14 in a state in which the user U comfortably puts the load on the wearable chair 1, θ12 denotes an angle formed between the shank link 12 and the knee link 14 when an angle formed by the shank link 12 relative to the foot frame 11 is about 45 degrees, and θ13 denotes an angle formed between the shank link 12 and the knee link 14 when an angle formed by the shank link 12 relative to the foot frame 11 is relatively perpendicular, θ12 may be less than θ11 and θ13 may be less than θ12.

In the meantime, while the shank link 12 rotates backward, an angle between the connecting link 13 and the knee link 14 may gradually increase. For example, when θ21 denotes an angle formed between the connecting link 13 and the knee link 14 in a state in which the user U comfortably puts the load on the wearable chair 1, θ22 denotes an angle formed between the connecting link 13 and knee link 14 when an angle formed by the shank link 12 relative to the foot frame 11 is about 45 degrees, and θ23 denotes an angle formed between the connecting link 13 and the knee link 14 when an angle formed by the shank link 12 relative to the foot frame 11 is relatively perpendicular, θ22 may be greater than θ21 and θ23 may be greater than θ22.

For example, referring to FIG. 6, in a state in which the user U comfortably puts the load on the wearable chair 1, the shank link 12 and the connecting link 13 may be opened toward the knee link 14. Referring to FIG. 8, when the shank link 12 is approximately perpendicular to the foot frame 11, the shank link 12 and connecting link 13 may be opened toward the foot frame 11.

While the shank link 12 rotates backward based on the foot frame 11, the knee link 14 may rotate in a direction opposite to a direction in which the shank link 12 rotates, based on the joint that connects the knee link 14 and the connecting link 13. The thigh link 15 may rotate with the knee link 14. The proximal fastening part 91 connected at the upper end of the thigh link 15 may lift the user U to stand up.

Figure 9:
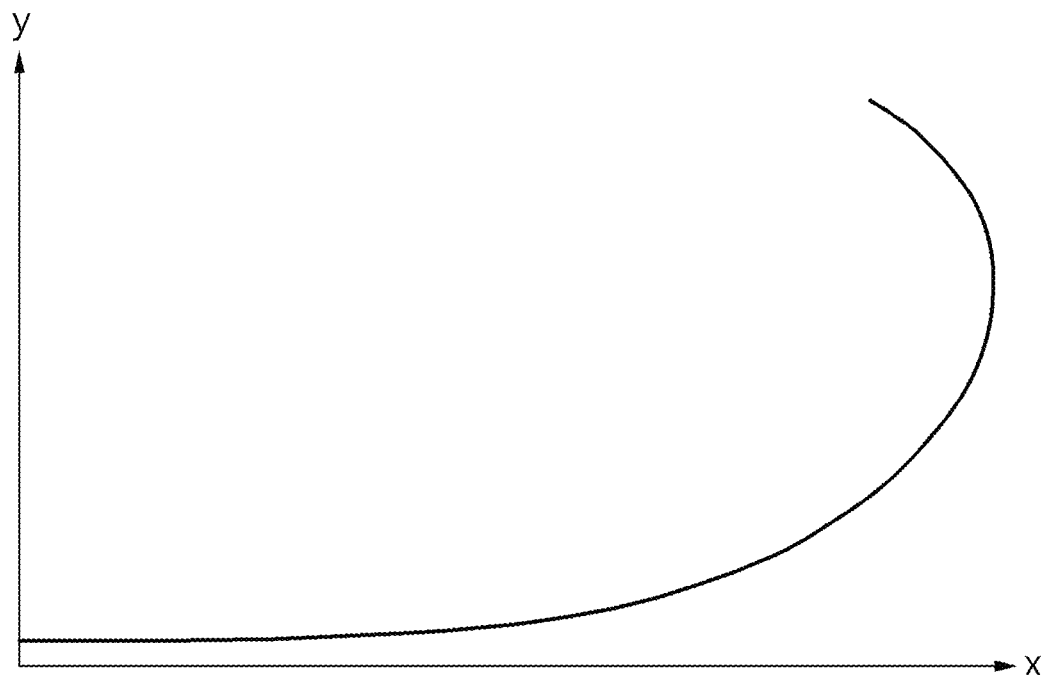
FIG. 9 is a graph showing a travel path of a thigh link head of a wearable chair according to example embodiment.

FIG. 9 is a graph showing a travel path of a thigh link head of a wearable chair according to example embodiment.

Referring to FIG. 9, the thigh link head may move along a downward convex (or, alternatively, a concave upward) path while a shank link rotates backward based on a foot frame. The thigh link head may ascend while the shank link rotates backward based on the foot frame. In the graph, a phase that proceeds in a −x direction while showing a sudden rise in an y axis is referred to as a standing-up phase. In the standing-up phase, a body of a user may be lifted to stand up through a thigh link.

Figure 11:
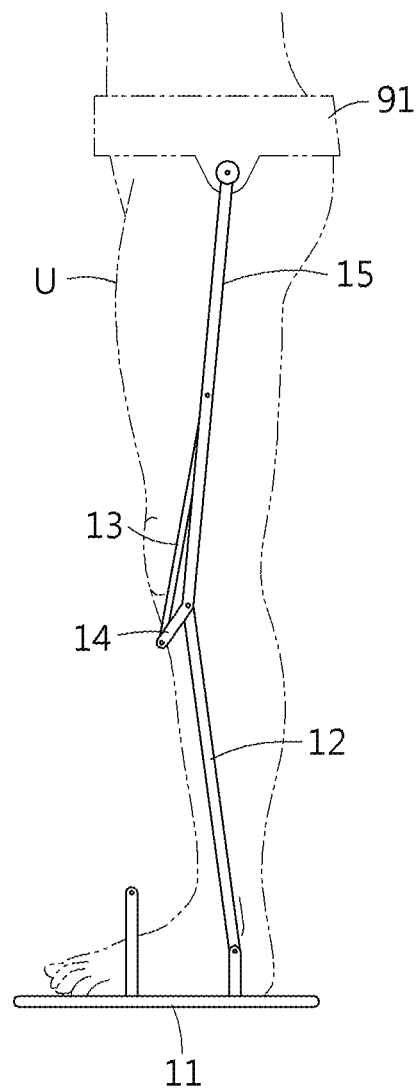
FIG. 11 is a side view illustrating a state in which a user wearing a wearable chair stands upright according to an example embodiment.

FIG. 10 is a side view illustrating a state in which a connecting link of a wearable chair is fastened to a thigh link according to an example embodiment, and FIG. 11 is a side view illustrating a state in which a user wearing a wearable chair stands upright according to an example embodiment.

Referring to FIGS. 10 and 11, the connecting link 13 may be connected to the foot frame 11 or may be separate from the foot frame 11. The connecting link 13 may be separate from the foot frame 11 and fastened to the thigh link 15. The user U may freely walk by fastening the connecting link 13 to the thigh link 15. When the connecting link 13 is separate from the foot frame 11, the foot frame 11, the shank link 12, the connecting link 13, and the knee link 14 may not constitute the four-bar linkage anymore. The shank link 12 may rotate based on the foot frame 11. The thigh link 15 may independently rotate based on the shank link 12 regardless of whether the shank link 12 rotates. The thigh link 15 may rotatably connect to the proximal fastening part 91. The user U may readily use an ankle joint, a knee joint, and a hip joint.

Figure 12:
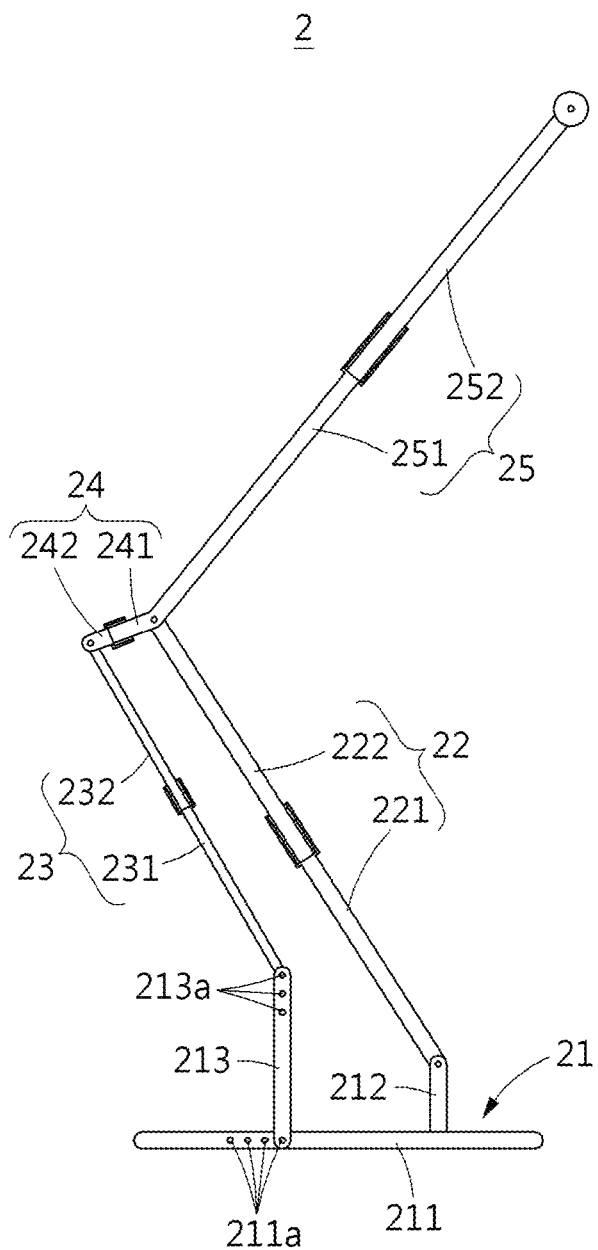
FIG. 12 is a side view of a wearable chair according to another example embodiment.

FIG. 12 is a side view of a wearable chair according to another example embodiment.

Referring to FIG. 2, a wearable chair 2 may include a foot frame 21, a shank link 22, a connecting link 23, a knee link 24, and a thigh link 25.

The foot frame 21 may include a foot frame body 211, a first support part 212, and a second support part 213.

An interval between the first support part 212 and the second support part 213 is adjustable. For example, the foot frame body 211 may include a plurality of foot frame grooves 211a aligned in a longitudinal direction. The first support part 212 may couple with one of the plurality of foot frame grooves 211a. As another example, the foot frame body 211 may include a body guide (not shown) formed in the longitudinal direction and configured to guide sliding of the second support part 213.

The second support part 213 may include a plurality of support grooves 213a aligned in a longitudinal direction. The connecting link 23 may couple with one of the plurality of support grooves 213a. A height from the foot frame 21 to a center of rotation of the connecting link 23 may be determined based on a position at which the connecting link 23 couples with the support groove 213a. That is, an interval between a joint that connects the connecting link 23 and the second support part 213 and the foot frame body 211 is adjustable. As another example, the second support part 213 may include a support guide (not shown) formed in the longitudinal direction and configured to guide sliding of the connecting link 23.

A length of at least one of the shank link 22, the connecting link 23, the knee link 24, and the thigh link 25 is adjustable.

For example, the shank link 22 may include a first sub-shank link 221 and a second sub-shank link 222 that are relatively movable in a longitudinal direction. The connecting link 23 may include a first sub-connecting link 231 and a second sub-connecting link 232 that are relatively movable in a longitudinal direction. The knee link 24 may include a first sub-knee link 241 and a second sub-knee link 242 that are relatively movable in a longitudinal direction. The thigh link 25 may include a first sub-thigh link 251 and a second sub-thigh link 252 that are relatively movable in a longitudinal direction.

A mode of a four-bar linkage configured using the foot frame 21, the shank link 22, the connecting link 23, and the knee link 24 may be changed by adjusting an interval between the first support part 212 and the second support part 213 or by adjusting a length of one of the shank link 22, the connecting link 23, and the knee link 24. A movement of an upper end of the thigh link 25 may be determined based on the mode of the four-bar linkage and accordingly, a mode and a position of a standing-up phase may be determined.

For example, sizes, for example, lengths, of the shank link 22 and the thigh link 25 may be determined to fit for a body size of a user and then the interval between the first support part 212 and the second support part 213 may be determined based on the determined size of the shank link 22, and lengths of the connecting link 23 and the knee link 24 may be determined. In this manner, the wearable chair 2 may provide a standing-up phase optimized for the user body.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wearable chair comprising:
   a foot frame configured to support a foot of a user;
   a shank link configured to rotatably connect to the foot frame;
   a connecting link provided in front of the shank link and configured to rotatably connect to the foot frame;
   a knee link configured to rotatably connect to each of the shank link and the connecting link such that the foot frame, the shank link, the connecting link, and the knee link form a four-bar linkage; and
   a thigh link configured to extend from the knee link.

2. The wearable chair of claim 1, wherein the thigh link comprises:
   a thigh link body having a first end and a second end, the first end connected to the knee link such that the thigh link body is configured to extend from the knee link backward towards a posterior of the user; and
   a thigh link head at the second end of the thigh link body.

3. The wearable chair of claim 2, wherein the thigh link head is configured to move along a downward convex path while the shank link rotates backward towards the posterior based on the foot frame.

4. The wearable chair of claim 2, wherein the thigh link head is configured to ascend while the shank link rotates backward towards the posterior based on the foot frame.

5. The wearable chair of claim 1, wherein the knee link and the thigh link are integrally formed.

6. The wearable chair of claim 1, wherein, while the shank link rotates backward towards a posterior of the user based on the foot frame, the four-bar linkage is configured to move such that an angle between the shank link and the knee link gradually decreases and an angle between the connecting link and the knee link gradually increases.

7. The wearable chair of claim 1, wherein a length of the shank link is greater than a length of the connecting link.

8. The wearable chair of claim 7, wherein a travel path of a first joint connecting the shank link and the knee link intersects a travel path of a second joint connecting the connecting link and the knee link.

9. The wearable chair of claim 1, wherein the foot frame comprises:
   a foot frame body; and
   a first support part configured to protrude upward from the foot frame body, and to rotatably support the shank link.

10. The wearable chair of claim 9, wherein the foot frame further comprises:
    a second support part, the second support part having a length greater than a length of the first support part, the second support part configured to protrude upward from the foot frame body, and to rotatably support the connecting link.

11. The wearable chair of claim 10, wherein the first support part and the second support part are connected to the foot frame body such that a distance between the first support part and the second support part is adjustable.

12. The wearable chair of claim 10, wherein the connecting link and the second support part are connected such that a distance between a joint that connects the connecting link and the second support part and the foot frame body is adjustable.

13. The wearable chair of claim 1, wherein the connecting link is configured to selectively disconnect from the foot frame to break the four-bar linkage.

14. The wearable chair of claim 13, wherein the thigh link comprises:
    a coupler configured to fasten the connecting link to the thigh link when the connecting link is disconnected from the foot frame.

15. The wearable chair of claim 1, wherein a length of at least one of the shank link, the connecting link, the knee link, and the thigh link is adjustable.

16. The wearable chair of claim 1, further comprising:
    a shank fastening part configured to fasten the shank link to a shank of the user; and
    a thigh fastening part configured to fasten the thigh link to a thigh of the user.

17. A wearable chair comprising:
    a thigh link configured to support a thigh of a user;
    a foot frame configured to support a foot of the user;
    a knee link configured to extend forward from the thigh link;
    a shank link configured to rotatably connect to the knee link and the foot frame, and to support a shank of the user; and
    a connecting link provided in front of the shank link and configured to rotatably connect to the knee link and the foot frame such that the foot frame, the shank link, the connecting link, and the knee link form a four-bar linkage.

18. The wearable chair of claim 17, wherein an upper end of the thigh link is configured to move along a downward convex path while the shank link rotates backward towards a posterior of the user based on the foot frame.

19. The wearable chair of claim 17, wherein a travel path of a first joint that connects the shank link and the knee link intersects a travel path of a second joint that connects the connecting link and the knee link.

20. The wearable chair of claim 17, wherein the connecting link is configured to selectively disconnect from the foot frame to break the four-bar linkage.

* * * * *